United States Patent
Amerige (10) Patent No.: US 9,703,477 B2
(45) Date of Patent: *Jul. 11, 2017

(54) HANDLING OVERLOADED GESTURES

(71) Applicant: Facebook, Inc., Menlo Park, CA (US)

(72) Inventor: Brian D. Amerige, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 841 days.

This patent is subject to a terminal disclaimer.

(21) Appl. No.: 13/770,506

(22) Filed: Feb. 19, 2013

(65) Prior Publication Data

US 2014/0237415 A1    Aug. 21, 2014

(51) Int. Cl.
- *G06F 3/0488* (2013.01)
- *G06F 9/44* (2006.01)
- *G06F 3/0484* (2013.01)

(52) U.S. Cl.
CPC ...... *G06F 3/04886* (2013.01); *G06F 3/04842* (2013.01); *G06F 9/4443* (2013.01)

(58) Field of Classification Search
CPC ............... G06F 3/04886; G06F 3/0488; G06F 2203/04803; G06F 2203/04808; G06F 3/017

See application file for complete search history.

(56) References Cited

U.S. PATENT DOCUMENTS

| 2005/0017957 A1 | 1/2005 | Yi |
| 2010/0077344 A1* | 3/2010 | Gaffney et al. ............... 715/788 |
| 2011/0179380 A1 | 7/2011 | Shaffer |
| 2011/0179387 A1* | 7/2011 | Shaffer ............... G06F 3/04883 715/835 |
| 2011/0252381 A1 | 10/2011 | Chaudhri |
| 2011/0307833 A1 | 12/2011 | Dale |
| 2012/0084680 A1* | 4/2012 | Gimpl et al. ................. 715/761 |

(Continued)

FOREIGN PATENT DOCUMENTS

| KR | 10-2012-0123476 A | 11/2012 |
| WO | WO 2009/111460 A1 | 9/2009 |

(Continued)

OTHER PUBLICATIONS

International Search Report and Written Opinion for Internationa Application PCT/US2014/015912, May 27, 2014.

(Continued)

*Primary Examiner* — Jeffrey A Gaffin
*Assistant Examiner* — Mandrita Brahmachari
(74) *Attorney, Agent, or Firm* — Baker Botts L.L.P.

(57) ABSTRACT

In one embodiment, a method includes receiving a touch input within a particular region of a display area of the computing device. The display area presents a user interface (UI) including a number of views and an outside view. Each of the views corresponds to one or more regions of the display area. One or more of the views has a gesture recognizer configured to process a touch input detected within the regions of the display area associated with each of the views. The outside view has a gesture recognizer configured to process the touch input detected within the display area. The views are organized in a hierarchy. The method also includes determining whether a particular one of the views from among the views is set as a modal view.

20 Claims, 4 Drawing Sheets

(56) References Cited

U.S. PATENT DOCUMENTS

2012/0278712 A1  11/2012 Wright
2013/0076615 A1* 3/2013 Iao ............................... 345/156

FOREIGN PATENT DOCUMENTS

WO   WO 2011-149674 A2   12/2011
WO   WO 2012/087939 A1   6/2012

OTHER PUBLICATIONS

European Patent Office Communication, Supplementary European Search Report and Annex to the European Search Report for Application No. EP 14 75 4442, Aug. 31, 2016.
Communication of result of substantive examination, Mexican Institute of Industrial Property (IMPI), Patent Application No. MX/a/2015/010696 (with English translation), Apr. 21, 2017.

* cited by examiner

HANDLING OVERLOADED GESTURES

TECHNICAL FIELD

This disclosure generally relates to mobile devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a user interface of a mobile device application that comprises a nested hierarchy of views may enable a particular view to over-ride the default behavior of a hit-test view. For example, the default behavior of the hit test may allocate a touch input to the lowest view that contains the area of the touch input. In particular embodiments, a view higher in the hierarchy may express it's interest in "winning" the hit test or process the touch input. The view that over-rides the default hit test view may be known as the modal view. In particular embodiments, a modal view may be eligible to process a touch input within the modal view and force the hit test view to defer processing of the touch input to the modal view. An example modal view is the full screen view of a photo in an application. Any touch of the photo should be processed by the photo view. In one example, modality may be implemented using run-time swizzling to over-ride methods within the mobile iOS for touch input processing.

DESCRIPTION OF EXAMPLE EMBODIMENTS

Figure 1:
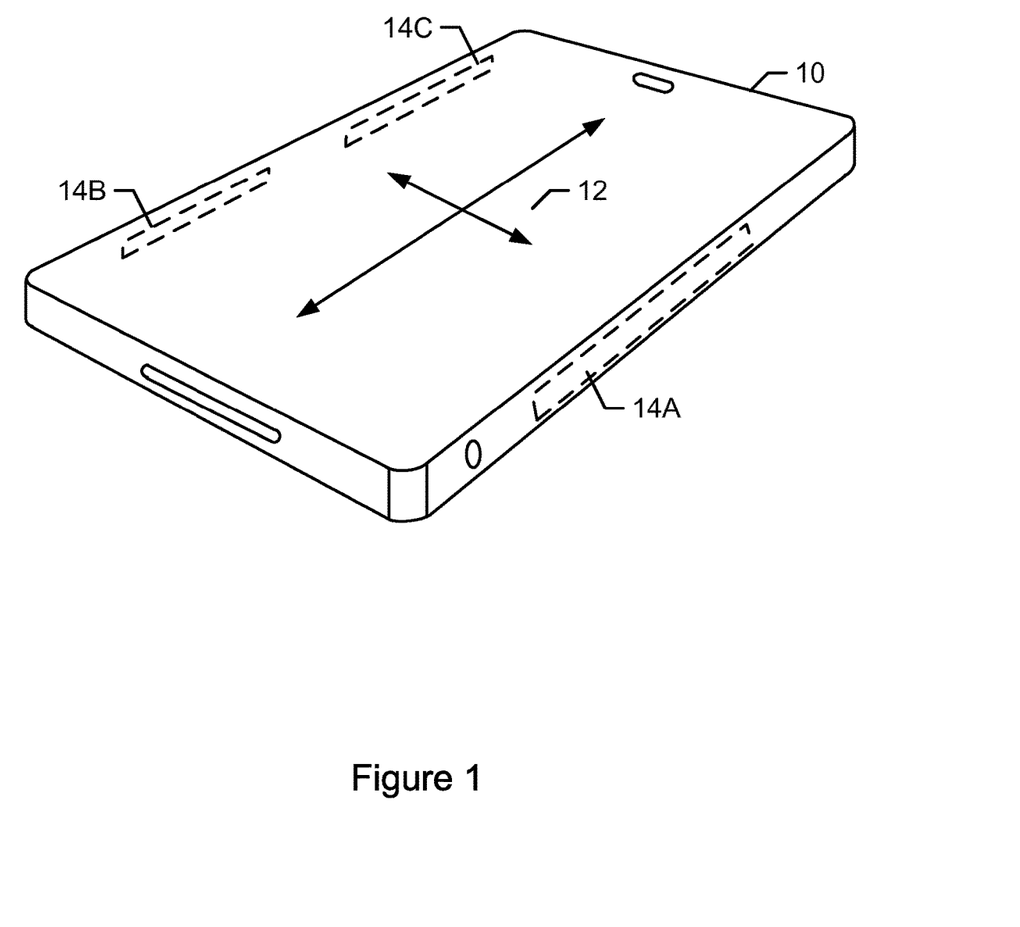
FIG. 1 illustrates an example mobile device.

FIG. 1 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 1, touch sensor 12 is incorporated on a front surface of mobile computing device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

In particular embodiments, an application executed on mobile computing device 10 may provide a user interface (UI) on a display of mobile computing device 10. As described below, the user of mobile computing device 10 may interact with the UI of a particular application through touch inputs detected by touch sensor 12. In particular embodiments, the application may correlate one or more touch inputs detected by touch sensor 12 with one or more interactions with the application. Although this disclosure illustrates and describes handling gestures on a particular type of computing device with a touch sensor, this disclosure contemplates handling gestures by any suitable type of computing device with a touch sensor, such as for example, a personal computer, tablet computer, connected television, or smartphone.

Figure 2:
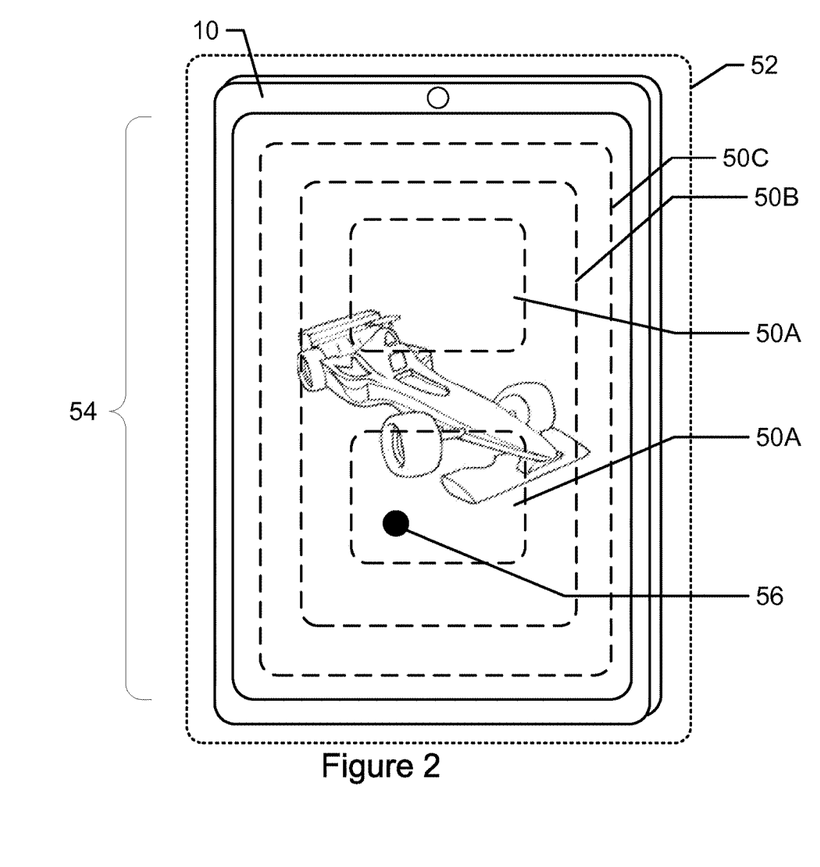
FIG. 2 illustrates an example wireframe of an example user interface with an example nested hierarchy of views.

FIG. 2 illustrates an example wireframe of an example user interface with an example nested hierarchy of views. In particular embodiments, the UI of an application displayed in display area 54 of mobile computing device 10 may include one or more views 50A-C that each correspond to a particular region of display area 54. Furthermore, a particular view 50A-C may handle processing one or more touch inputs detected within the associated region of display area 54. In particular embodiments, the touch inputs may be processed through a gesture recognizer associated with each view 50A-C. In particular embodiments, views 50A-C with overlapping regions of display area 54 may be organized into a nested hierarchy based at least in part on the size of the corresponding area of display area 54. In the example of FIG. 2, view 50C has a portion of its corresponding area of display 54 that overlaps the corresponding area of view 50B. Moreover, a region of view 50B overlaps the area of display area 54 that corresponds to view 50A. As an example and not by way of limitation, a particular nested hierarchy of views 50A-C may process touch inputs by assigning the highest priority for a view 50A-C lowest in the hierarchy that encompasses the touch input and does not substantially encompass another view 50A-C within it. For example, a touch input 56 within a particular region of display area 54 corresponding to views 50A-C of the hierarchy may be processed by view 50A. Although this disclosure illustrates and describes a particular configuration of a particular number of views associated with particularly shaped regions of the display area, this disclosure contemplates any suitable configuration of any suitable number of views associated with any suitably shaped region.

In particular embodiments, the hierarchy of views 50A-C of an application may be modified such that touch input 56 may be processed by a view 50B-C higher in the nested hierarchy than view 50A, such as for example one of views 50B-C. As an example and not by way of limitation, an application may modify the ranking of the gesture recognizer associated with each view 50A-C within the hierarchy such that the gesture recognizer associated with a particular higher level view (e.g. 50B-C) or a "modal" view may process touch input 56. As an example and not by way of limitation, a particular view (e.g. 50C) may be designated the modal view and the application may force the gesture recognizer associated with view 50A to defer processing of touch input 56 to the gesture recognizer associated with the modal view (e.g. 50C). Furthermore, the application may designate the modal view by setting a modal view flag associated with the particular view (e.g. 50C). Although this disclosure describes a particular view being a modal view, this disclosure contemplates designating any suitable view as being the modal view.

In particular embodiments, the UI of a particular application executed on mobile computing device 10 may include an outside view 52 in addition to views 50A-C. Outside view 52 may have an associated area of coverage that encompasses a region outside the boundaries of display area 54. In particular embodiments, setting the modal view flag associated with a modal property by the application executed on mobile computing device 10 retargets the gesture recognizer associated with a particular modal view 50A-C to the gesture recognizer associated with outside view 52, thereby enabling the gesture recognizer associated with the particular view 50A-C to be eligible to process touch input 56 within any region of display area 54 instead of being confined to processing touch inputs within the region of display area 54 associated with the particular view 50A-C. As described below, associating the gesture recognizer of the particular modal view with the gesture recognizer of outside view 52 ensures the gesture recognizer of the particular modal view is eligible to process any touch input 56 performed within display area 54. In particular embodiments, the gesture recognizer associated with the modal view may set a modal view flag to indicate modal gesture recognizer will over-ride the nest hierarchy of views 50A-C.

In particular embodiments, an application may query each view 50A-C and outside view 52 of the hierarchy to determine one or more views 50A-C and outside view 52 eligible to process touch input 56, in response to detecting touch input 56. In particular embodiments, the application executed on mobile computing device 10 may determine that one or more eligible views 50A-C have an associated gesture recognizer that is configured to process touch input 56. As described above, the gesture recognizer associated with a modal view may be retargeted to the gesture recognizer associated with outside view 52. The application executed on mobile computing device 10 may allow the gesture recognizer associated with the modal view (e.g. 50C) to prevent any of the remaining non-modal views (e.g. 50A-B) from processing touch input 56 and restrict the remaining non-modal views (e.g. 50A-B) from preventing the modal view from processing touch input 56 through outside view 52. In response to detecting touch input 56, each eligible gesture recognizer in the hierarchy is queried from lowest to highest view 50A-C and outside view 52 of the hierarchy to determine if any view 50A-C may prevent another view 50A-C from processing the detected touch input 56. In the example of FIG. 2, initially the application will query the gesture recognizer associated with view 50A, then the gesture recognizer of views 50B-C according to the hierarchy of views described above. As an example and not by way of limitation, the gesture recognizer associated with view 50A may query the gesture recognizer associated with view 50B whether the gesture recognizer associated with view 50B may prevent the gesture recognizer associated with view 50A from processing touch input 56. As described above, the gesture recognizer associated with outside view 52 may prevent non-modal views (e.g. 50A-B) from processing touch input 56 and restrict non-modal views (e.g. 50A-B) from preventing any view 50A-B from processing touch input 56, thereby modifying the nested hierarchy such that touch input 56 is processed by the retargeted gesture recognizer associated with the modal view (e.g. 50C). As an example and not by way of limitation, modifying the nested hierarchy as described above may be implemented through any suitable method-swapping protocol, such as for example, run-time swizzling. As another example, a custom gesture recognizer associated with each view 50A-C may enforce a modified hierarchy described above.

Figure 3:
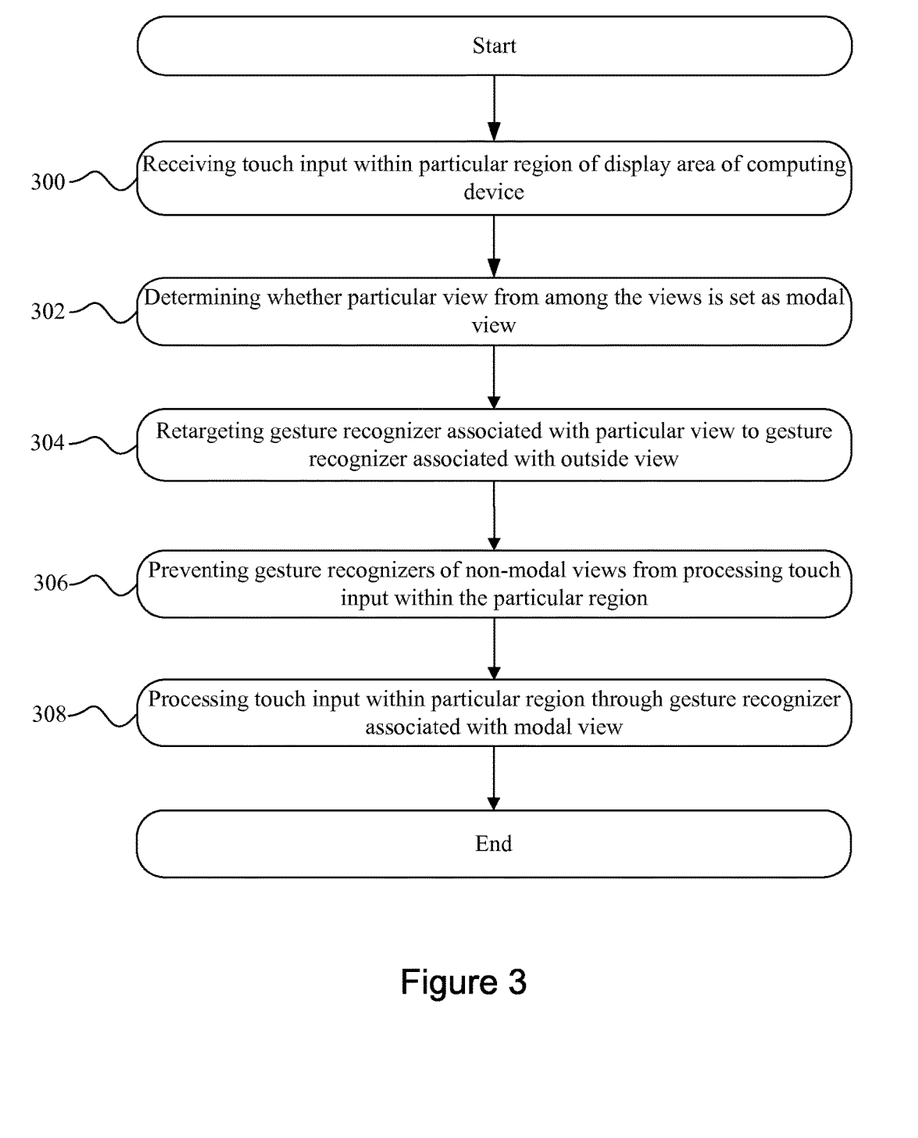
FIG. 3 illustrates an example method for handling overloaded gestures.

FIG. 3 illustrates an example method for handling overloaded gestures. The method may start at step 300, where a computing device receives a touch input within a particular region of a display area of the computing device. In particular embodiments, the display area presents a user interface (UI) comprising a plurality of views and an outside view. In particular embodiments, each of the views corresponds to one or more regions of the display area. In particular embodiments, one or more of the views has a gesture recognizer configured to process a touch input detected within the regions of the display area associated with each of the views. the outside view having a gesture recognizer configured to process the touch input detected within the display area, the views being organized in a hierarchy. Step 302 determines, by the computing device, whether a particular one of the views from among the plurality of views is set as a modal view. Step 304 retargets, by the computing device, the gesture recognizer associated with the particular view to the gesture recognizer associated with the outside view in response to determining the particular view is set as the modal view. At step 306 the computing device prevents the gesture recognizers of one or more non-modal views from processing the touch input within the particular region in response to a presence of the modal view. At step 308 the computing device processes the touch input within the particular region through the gesture recognizer associated with the modal view in response to the presence of the modal view, at which point the method may end. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
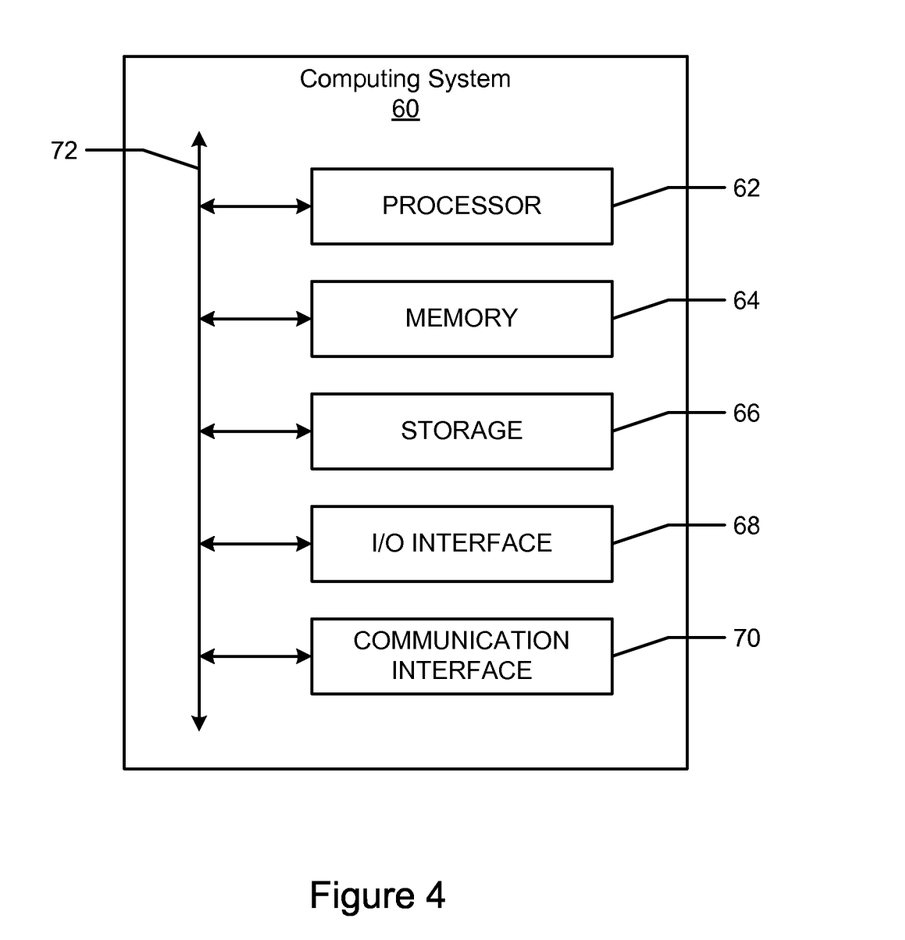
FIG. 4 illustrates an example computing system.

FIG. 4 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by a computing device, receiving a touch input within a particular region of a display area of the computing device, the display area presenting a user interface (UI) comprising a plurality of views organized in a hierarchy and an outside view, wherein each of the views organized in a hierarchy correspond to one or more regions of the display area and have a respective gesture recognizer, one or more of the views organized in a hierarchy being an eligible view having a respective gesture recognizer configured to process a touch input detected within the particular region of the display area, and wherein the outside view has a gesture recognizer having an area of coverage that encompasses a region outside a boundary of the display area, the outside view being eligible to process a touch input detected within any region of the display area;

by the computing device, identifying a particular one of the views from among the plurality of views as a modal view;

by the computing device, associating the gesture recognizer of the modal view with the gesture recognizer of the outside view in response to the identification of the modal view and enabling eligibility of the gesture recognizer of the modal view to process the touch input within any region of the display area;

by the computing device, preventing the gesture recognizers of one or more eligible views other than the modal view from processing the touch input within the particular region in response to the identification of the modal view; and by the computing device, processing the touch input within the particular region through the gesture recognizer associated with the modal view in response to the identification of the modal view.

2. The method of claim 1, further comprising:

by the computing device, determining one or more of eligible views from among the plurality of views, each of the eligible views having one or more corresponding regions of the display area that encompasses the particular region containing the touch input;

by the computing device, determining a lowest eligible view in the hierarchy based at least in part on a size of one or more of the regions associated with each eligible view; and by the computing device, processing the touch input within the particular region through the gesture recognizer associated with the lowest eligible view in response to an absence of the modal view.

3. The method of claim 1, wherein the computing device is a mobile computing device.

4. The method of claim 3, wherein the method is executed by an application of the mobile computing device.

5. The method of claim 1, further comprising:

preventing the gesture recognizers of one or more of the eligible views other than the modal view from processing the touch input within the particular regions in response to the presence of the modal view; and restricting one or more of the eligible views other than the modal view from preventing the gesture recognizer associated with the modal view from processing the touch input in response to the presence of the modal view.

6. The method of claim 1, selecting the particular one of the views comprises setting a modal view flag of the particular one of the views.

7. The method of claim 1, wherein the association of the gesture recognizer of the modal view with the gesture recognizer of the outside view comprises mapping the gesture recognizer associated with the modal view to the gesture recognizer associated with the outside view through run-time swizzling.

8. The method of claim 1, wherein the modal view is higher in the hierarchy than one or more of the eligible views other than the modal view.

9. One or more computer-readable non-transitory storage media embodying software configured when executed to:

receive a touch input within a particular region of a display area of a computing device, the display area presenting a user interface (UI) comprising a plurality of views organized in a hierarchy and an outside view, wherein each of the views organized in a hierarchy correspond to one or more regions of the display area and have a respective gesture recognizer, one or more of the views organized in a hierarchy being an eligible view having a respective gesture recognizer configured to process a touch input detected within the particular region of the display area, and wherein the outside view has a gesture recognizer having an area of coverage that encompasses a region outside a boundary of the display area, the outside view being eligible to process a touch input detected within any region of the display area;

identify a particular one of the views from among the plurality of views as a modal view;

associate the gesture recognizer of the modal view with the gesture recognizer of the outside view in response to the identification of the modal view and enabling eligibility of the gesture recognizer of the modal view to process the touch input within any region of the display area;

prevent the gesture recognizers of one or more eligible views other than the modal view from processing the touch input within the particular region in response to the identification of the modal view; and process the touch input within the particular region through the gesture recognizer associated with the modal view in response to the identification of the modal view.

10. The media of claim 9, wherein the software is further configured to:

determine one or more of eligible views from among the plurality of views, each of the eligible views having one or more corresponding regions of the display area that encompasses the particular region containing the touch input;

determine a lowest eligible view in the hierarchy based at least in part on a size of one or more of the regions associated with each eligible view; and process the touch input within the particular region through the gesture recognizer associated with the lowest eligible view in response to an absence of the modal view.

11. The media of claim 9, wherein the computing device is a mobile computing device.

12. The media of claim 11, wherein the software is an application of the mobile computing device.

13. The media of claim 9, wherein the software is further configured to:
prevent the gesture recognizers of one or more of the eligible views other than the modal view from processing the touch input within the particular regions in response to the presence of the modal view; and
restrict one or more of the eligible views other than the modal view from preventing the gesture recognizer associated with the modal view from processing the touch input in response to the presence of the modal view.

14. The media of claim 9, wherein the software is further configured to set a modal view flag of the particular one of the views.

15. The media of claim 9, wherein the software is further configured to map the gesture recognizer of the modal view with the gesture recognizer associated with the outside view through run-time swizzling.

16. The media of claim 9, wherein the modal view is higher in the hierarchy than one or more of the eligible views other than the modal view.

17. A device comprising:
a processor; and
one or more computer-readable non-transitory storage media coupled to the processor and embodying software that:
receive a touch input within a particular region of a display area of a computing device, the display area presenting a user interface (UI) comprising a plurality of views organized in a hierarchy and an outside view, wherein each of the views organized in a hierarchy correspond to one or more regions of the display area and have a respective gesture recognizer, one or more of the views organized in a hierarchy being an eligible view having a respective gesture recognizer configured to process a touch input detected within the particular region of the display area, and wherein the outside view has a gesture recognizer having an area of coverage that encompasses a region outside a boundary of the display area, the outside view being eligible to process a touch input detected within any region of the display area;
identify a particular one of the views from among the plurality of views as a modal view;
associate the gesture recognizer of the modal view with the gesture recognizer of the outside view in response to the identification of the modal view and enabling eligibility of the gesture recognizer of the modal view to process the touch input within any region of the display area;
prevent the gesture recognizers of one or more eligible views other than the modal view from processing the touch input within the particular region in response to the identification of the modal view; and
process the touch input within the particular region through the gesture recognizer associated with the modal view in response to the identification of the modal view.

18. The device of claim 17, wherein the software is further configured to:
determine one or more of eligible views from among the plurality of views, each of the eligible views having one or more corresponding regions of the display area that encompasses the particular region containing the touch input;
determine a lowest eligible view in the hierarchy based at least in part on a size of one or more of the regions associated with each eligible view; and
process the touch input within the particular region through the gesture recognizer associated with the lowest eligible view in response to an absence of the modal view.

19. The device of claim 17, wherein the software is further configured to:
prevent the gesture recognizers of one or more of the eligible views other than the modal view from processing the touch input within the particular regions in response to the presence of the modal view; and
restrict one or more of the eligible views other than the modal view from preventing the gesture recognizer associated with the modal view from processing the touch input in response to the presence of the modal view.

20. The device of claim 17, wherein the software is further configured to set a modal view flag of the particular one of the views.

* * * * *